Jan. 16, 1962     A. LYSHOLM     3,016,709
SINGLE STAGE TURBINE HYDRAULIC TORQUE CONVERTER
Filed Nov. 16, 1953
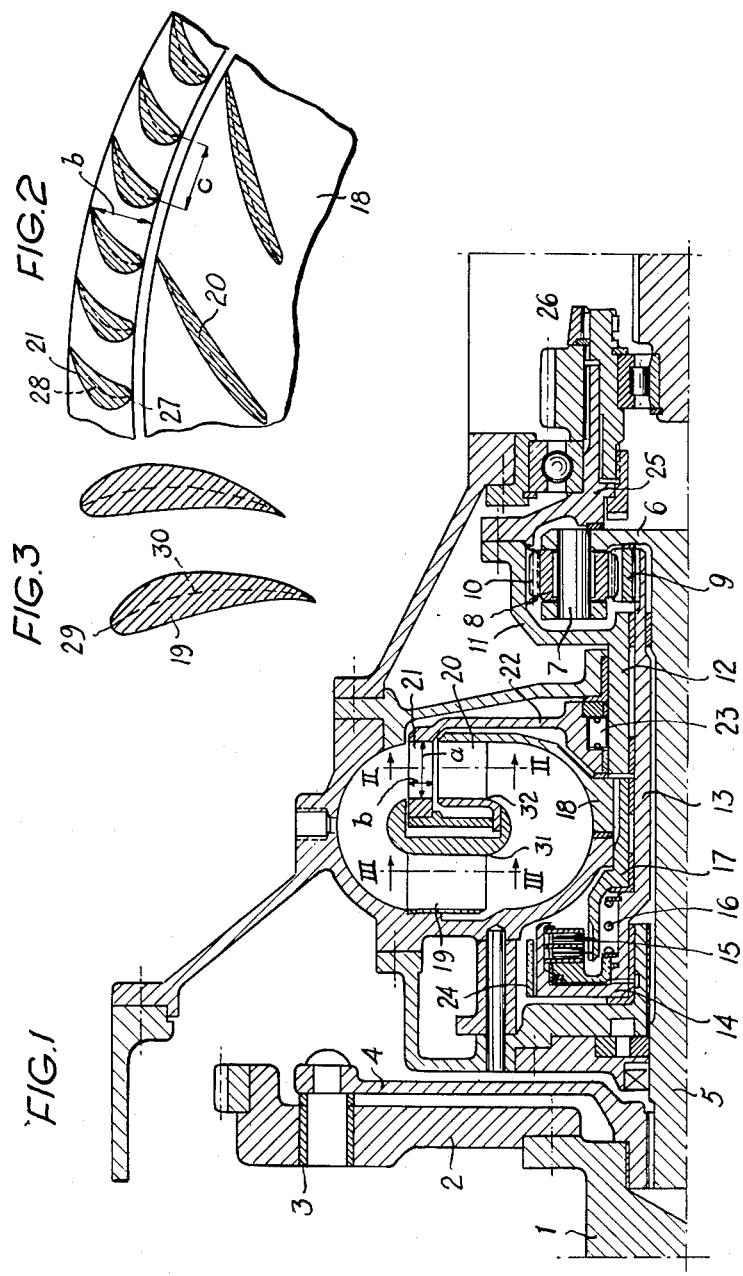

United States Patent Office 3,016,709
Patented Jan. 16, 1962

3,016,709
SINGLE STAGE TURBINE HYDRAULIC TORQUE
CONVERTER
Alf Lysholm, Karlaplan 11, Stockholm, Sweden
Filed Nov. 16, 1953, Ser. No. 392,390
Claims priority, application Sweden Jan. 21, 1953
7 Claims. (Cl. 60—54)

The present invention relates to a single stage three element hydraulic torque converters of the kind comprising an impeller member, a turbine member and a reaction member or reactor, each having a single ring of blades operative in a closed toroidal circuit formed by these members together with a housing structure containing the several members. More particularly the invention relates to such converters of a kind particularly suitable for use in hydraulic transmissions of the so-called split torque type, which are charactereized by a drive through which only a part of the output torque is transmitted hydraulically to the driven member of the transmission, with the remaining part of the torque being transmitted mechanically.

Split torque transmissions of the kind to which the present invention is particularly applicable are desirable from the standpoint of increasing the maximum overall efficiency of the transmission as a whole, as compared with the maximum efficiency developed by the torque converter component alone, and also from the standpoint of increasing the utility range of the transmission as compared with that of the torque converter component alone. By utility range is meant that range of speeds of the driven member of the transmission, relative to the speed of the driving member, through which the efficiency of power transmission is at or above a predetermined acceptable minimum value.

While the objectives of increased overall efficiency and wider utility range are achieved by the use of split torque drive, this type of drive inherently introduces the negative or undesirable characteristic of reducing the stall torque ratio obtainable with a transmission having a given torque converter component, as compared with the stall torque ratio obtainable with that same converter alone.

For many applications the minimum requirements for stall torque ratio are sufficiently high so that single stage converters as heretofore developed have not been practically useful with split torque drives because of their inability to develop sufficiently high stall torque characteristics, and thus numerous different expedients have been used in the past in split torque drives for obtaining the required stall torque characteristics, either by using double rotation types of converters or multiple stage single rotation types, both of which are capable of producing higher stall ratios than single stage converters as heretofore developed. However, both double rotation and multiple stage single rotation converters are much more complex, heavier and more expensive than single stage converters and additionally have other operating characteristics which make them less desirable than single stage converters for use in split torque drives.

It is therefore the primary object of the present invention to provide a new and improved form of single stage converter which will provide higher stall torque characteristics than those heretofore obtainable with this type of converter, for example of the order of 6 to 1, or better, while at the same time maintaining maximum efficiency and utility range at acceptable values comparable with those heretofore obtained with converters having much lower stall torque ratios.

Other and more detailed objects and the manner in which the several objects are best attained will become apparent as the ensuing portion of this specification proceeds, in which, by way of example but without limitation, a converter embodying the principles of the invention is disclosed as a component of a split torque type of transmission of a kind for which the converter is particularly adapted.

In the accompanying drawings forming a part hereof, illustrative of such a transmission:

FIG. 1 is a longitudinal central section of the upper half of a transmission incorporating a converter embodying the invention;

FIG. 2 is a cross-section on larger scale taken on the line 2—2 of FIG. 1; and

FIG. 3 is a cross-section on larger scale taken on the line 3—3 of FIG. 1.

Referring now to the drawings, the transmission shown is intended for use with high speed engines of the kind characterized by a torque ratio, that is, the ratio of the maximum torque developed to the torque developed at maximum engine speed, of 1.2:1, or greater. In this type, the differential gearing being determinative of the proportion of the torque transmitted through the converters, is made in such a way that about one-third is transmitted hydraulically with the remainder being transmitted mechanically.

Referring now to FIG. 1, the engine shaft is indicated at 1 and the flywheel attached thereto at 2. The rotation of the flywheel is transmitted via a flexible coupling 3 to a disc 4, rigidly mounted on a central shaft 5 which at its further end is formed with a flange 6 carrying a number of shafts 7 for planet gears 8 engaging a central sun gear 9 and also with a ring gear 10 having teeth formed internally of a drum 11 which is integral with a shaft 12. The sun gear 9 is rigidly mounted on a hollow shaft 13 having at its forward end a flange 14, which by means of a friction clutch 15 biased by a spring 16 may be connected to a hollow shaft 17 on which the impeller wheel 18 of the hydraulic system is rigidly mounted. The impeller blades 20 are arranged with their outlet edges immediately adjacent to the inlet edges of the turbine blades 21 carried by the turbine member 22, which through an over-running clutch 23 is mounted on shaft 12. The stationary guide or reaction blades are indicated at 19.

A brake by means of which the shaft 13 together with the sun gear 9 and thus also the shaft 17 and the impeller may be stopped is indicated at 24.

The shaft 12 is rigidly connected to a shaft 25 constituting the driven or output shaft of the transmission, which may for example be connected to the power consumer desired to be driven by the transmission and indicated in part generally at 26.

The hydraulic system comprises a closed toroidal circuit, and as will be seen from FIG. 1 is formed in part by the stationary housing structure which supports the several rotatably mounted members hereinbefore described and in part by the impeller, turbine and reaction members through the blade rings of which the working fluid in the circuit is circulated. Further it will be seen that this circuit is comprised of a radially extending outflow section in which are located the rings of impeller and turbine blades, a radial inflow section in which is located the ring of reaction blades, and bladeless inner and outer return bend sections which serve to connect the radial outflow and the radial inflow sections.

As will be seen from FIG. 2 the turbine blades 21 have a thick and bluntly rounded leading edge 27 and a strongly curved camber line 28. In the specific embodiment shown the aspect ratio of the turbine blades, that is, the ratio of the blade length $a$ (FIG. 1) to the blade width $b$ is 2.3:1 and the pitch ratio, that is, the ratio of the peripheral center-to-center distance $c$ between adjacent blades at the inlet edges thereof (which distance for the purposes of this description is designated as the pitch of the blades), to the blade width $b$ (FIG. 2), is 1.15:1. Also, for convenience in considering the width of the blades in connection with the ratio herein given, the width is taken, as shown in FIG. 2, as the width in radial direction, rather than as the chord of the blade, which is the straight line distance from the inlet edge to the outlet edge of the blade.

Reaction blades 19 also are provided with relatively bluntly rounded leading edges 29 (FIG. 3), but as will be observed from a comparison of FIGS. 2 and 3 the ratio of blade width to maximum blade thickness is somewhat less in the case of the reaction blades, as compared with the turbine blades, so that they may be said to have a thinner profile. Also it is to be noted that the camber line 30 of the reaction blades is less strongly curved than the camber line 28 of the turbine blades. The width of the reaction blades is substantially greater than their length, giving an aspect ratio of considerably less than 1:1, and which in the embodiment illustrated is substantially 0.65:1.

From the foregoing it will be evident that a definite characteristic of the circuit embodying the invention is the use of a relatively high aspect ratio for the turbine blades and a relatively low aspect ratio for the reaction blades. Obviously, the precise values required for optimum performance will vary somewhat with different specific designs appropriate for different specific drives. Thus the ratio for the turbine blades may be less than 2.3:1, as shown in the illustrated embodiment and the ratio for the reaction blades may be greater than 0.65:1, as shown. In substantially all cases however if optimum results are to be achieved, it is desirable to keep the aspect ratio for the turbine blades over 1.5:1 and that for the reaction blades less than 0.8:1.

Further it is to be noted that in the case of both the turbine and reaction blades the tangents to the camber lines at the inlet edges of the blades are substantially radial.

For use with blading having the above described characteristics and arrangement an impeller having blades 20 with substantially straight profiles as shown in FIG. 2, and an aspect ratio of approximately 1:1 is advantageously employed.

Among other factors determinative of the stall torque developed in a circuit of the character under consideration are the forces of action and reaction resulting from the peripheral components of the velocities of flow of the working fluid entering and leaving the single stage of turbine blading. The magnitude of the forces developed by these peripheral components of the flow is obviously a function of the mass of working fluid circulated per unit of time and consequently from that it follows that, other things being equal, increase in the rate of flow of the working fluid under stall conditions will result in an increase in the stall torque ratio developed.

Accordingly, in accordance with the principles of the present invention, the flow circuit and the nature and disposition of the blading is arranged to produce as nearly as possible the maximum rate of flow at stall for a given hydraulic head developed by the impeller.

To this end the inner and outer return bend sections are kept free from blading so as to reduce to a minimum the skin friction loss in these portions of the circuit and additionally the circuit is made as compact as possible to reduce its total length, by confining the length of the radial inflow and outflow sections to a length not materially greater than that required to accommodate the three rings of blading required for operation of the device.

Thus as is clearly illustrated in the embodiment disclosed, the impeller blades 20 and the turbine blades 21 are arranged with the outlet edges of the impeller blades closely adjacent to the inlet edges of the turbine blades, the combined widths of the two rings of blades occupying substantially the entire radial extent of the outflow section of the circuit. In addition to making a most compact circuit possible, this arrangement is an aid in obtaining highly efficient operation since the close proximity of the inlet edges of the turbine blades to the outlet edges of the impeller blades insures a most efficient utilization of the maximum velocity of the fluid leaving the impeller blades, which velocity is not uniform across the space between the outlet edges of adjacent impeller blades.

For similar reasons the reaction blades are, as shown, made substantially coextensive in width with the radial extent of the radial inflow section of the circuit and with their inlet edges at substantially the same radius as that of the outlet edges of the turbine blades. By making the turbine outlet and the reaction inlet of substantially equal diameter, substantially the same angular velocities, both as to peripheral and radial components, are obtained at these two important points in the circuit and losses which would be produced if these two sets of edges were on different diameters, are avoided. Likewise, for similar reasons, the outlet or trailing edges of the reaction blades are disposed at substantially the same radius as that of the leading or inlet edges of the impeller blades. Making the reaction blades with a relatively low aspect ratio not only reduces the parasitic losses due to secondary vortexes created along the inner and outer walls of the channels in the flow of the working fluid passing through the reaction blade ring, but also serves to afford passages between adjacent blades sufficiently long to correct the separation that occurs between the working fluid and the rear faces of the reaction blades in the inlet portions of the channels between the blades under stall conditions when the working fluid is discharged from the stationary turbine blades to the reaction blade row with a high peripheral component of flow.

As previously noted the return bend sections of the circuit are bladeless, but an additional important factor, particularly with respect to the inner return bend section, is that the walls are so curved that the cross-sectional area for flow of the working fluid from the outlet of the reaction blades to the inlet of the impeller blades is substantially constant and substantially equal to the cross-sectional areas of the circuit at the exit from the radial inflow section and at the entrance to the radial outflow section so that losses resulting from any abrupt changes in velocity of flow from the outlet of the reactor to the inlet of the impeller are avoided.

The inner and outer walls of the circuit are preferably, as shown, plane and perpendicular to the axis of rotation, which aids in enabling a circuit of minimum length to be obtained and moreover results in greater blade length at the outlet edges of the impeller blade than would be the case were the walls inclined toward each other in radial outward direction, as is frequently the case in circuits of the kind under consideration. This greater length of the outlet edges of the impeller blades also makes more readily obtainable the desired relatively high value of the aspect ratio of the turbine blades, without resorting to the use of blades which are undesirably narrow when considered from a structural standpoint, bearing in mind that the single row of turbine blades must develop and transmit the total torque delivered by the converter. The desirability of the high aspect ratio is due to the fact that this characteristic is effective to produce a relatively broad range of high efficiency operation, in other words, a relatively wide utility range.

Inasmuch as the value of the stall torque obtained is so importantly influenced by the rate of circulation at stall, it is evident that any restriction in the circuit tending to reduce the rate below that desired through the torque producing turbine member is to be avoided and to that end the circuit should be laid out as shown so that the total of the throat areas through the ring of turbine blades provides the restriction primarily governing the rate of circulation of the working fluid, with the total of the throat areas through the ring of reaction blades being substantially the same as but not appreciably greater than that through the turbine member.

The high stall torque ratio obtained, coupled with the retention of high efficiency and relatively wide utility range is in the present instance obtained by the particular combination of the several factors hereinabove briefly touched upon and as will be evident from the disclosure, these factors contribute to the formation of a novel circuit which is relatively wide as compared with its radial extent, the relationship preferably being such that the combined width of the radial inflow and outflow sections represented by the lengths of the impeller and reaction blades is greater than the radial extent of the radial outflow and inflow sections of the circuit passages in which these blades are located. From a purely structural standpoint this further provides the advantage of a converter of relatively small overall diameter for a given torque transmitting capacity.

The operation of the transmission should be largely obvious from the foregoing description.

By means of the parts 1, 2, 3, 4, 5 and 6 the engine torque is transmitted to the planetary gear, which splits the torque in such fashion that one-third of the torque is transmitted from the planet gears 8 to which the input torque is delivered, through the sun gear 9, shaft 13, clutch 15, impeller 18, 20, turbine 21, 22, shaft 12 and drum 11, to the drive shaft 25, whereas two-thirds of the input torque are transferred from the planet gears 8 to the driven shaft 25 through the ring gear 10. The clutch 15 thus needs to be designed to transmit only one-third of the maximum torque developed by the engine and consequently can be made relatively small and light. Normally this clutch is engaged and is released only when it is desired to disconnect or reverse the power consumer 26, in order to prevent hydraulic drag through the torque converter when this is done.

In the above described arrangement it will be evident that only one-third of the engine torque is subject to torque multiplication but with the high stall torque ratio obtained with the converter embodying the principles of the present invention sufficient torque multiplication at stall for certain types of vehicles, particularly high speed vehicles such as passenger car automobiles, is obtained. The transmission herein disclosed is particularly adapted for that type of use since in the arrangement shown, a mechanical over-drive is obtainable if the sun gear 9 and the impeller are locked by means of the brake 24. If this is done the hydraulic circuit is automatically disconnected by the overrunning clutch 23 and in this case the planetary gear, which in the embodiment shown has a gear ratio of 1.5:1, operates to provide a direct mechanical connection through the transmission from the input shaft to the output shaft, with the latter turning at higher speed than the former.

The novel features of the transmission organization just described form no part of the invention herein claimed, such subject matter constituting the claimed subject matter of my divisional application Serial No. 142,325 filed October 2, 1961.

What I claim is:

1. A hydraulic torque converter comprising a housing structure having a central axis, a single stage impeller member comprising a ring of impeller blades rotatable about said axis, a single stage turbine member comprising a ring of turbine blades rotatable about said axis and a rotationally stationary reaction member having a ring of reaction blades concentric with said axis, said housing structure and said members together providing a closed toroidal circuit having spaced inner and outer walls concentric with said axis for flow of working fluid therebetween, said circuit comprising a radially extending outflow section, a radially extending inflow section and smoothly curved bladeless inner and outer return bend sections connecting said outflow and inflow sections, said ring of impeller blades and said ring of turbine blades being located in said outflow section with the turbine blades immediately adjacent to and radially outwardly of the impeller blades and said ring of reaction blades being located in said inflow section, the radial extent of the outflow section being substantially the same as that of the combined radial widths of said impeller and turbine blades and the radial width of the reaction blades being substantially coextensive with the radial extent of said inflow section, the inlet edges of the reaction blades and the outlet edges of the turbine blades being located at substantially the same radius from said axis, the curvature of the walls of the inner return bend section of the circuit providing a substantially constant cross-sectional free flow area through the section, the inner and outer walls of the inflow and outflow sections being substantially parallel in planes normal to said axis and being axially spaced to provide an outflow section having a cross-sectional area normal to said inner and outer walls immediately ahead of the inlet edges of the impeller blades and an inflow section having a cross-sectional area normal to said inner and outer walls immediately after the outlet edges of the reaction blades substantially equal to the cross-sectional free flow area through the inner return bend section, whereby to avoid abrupt change of velocity of the working fluid when passing into and out of said inner return bend section, said turbine and reaction members both being provided with reaction type blades of the kind having thick and bluntly rounded inlet edges disposed so that the tangents to the camber lines of the blades at the inlet edges are substantially radial and the outlet angles of the blades provide a total throat area for flow of the working fluid through the blade ring of the turbine member substantially the same as but not appreciably greater than the corresponding area for flow of working fluid through the blade ring of said reaction member and each of said total throat areas being smaller than the flow area of any remaining place in the circuit other than through said ring of impeller blades, whereby the throat area through the turbine blades provides the restriction primarily governing the rate of circulation of the working fluid resulting from any given hydraulic head developed by the impeller, the width of said reaction blades being related to the length thereof to provide an aspect ratio of less than 1 and the width of said turbine blades being related to the length thereof to provide an aspect ratio greater than 1.5:1.

2. A hydraulic torque converter as defined in claim 1, in which the combined lengths of the impeller blades and the reaction blades exceed the radial length of the outflow section of said circuit.

3. A hydraulic torque converter as defined in claim 1, in which the aspect ratio of said turbine blades is substantially equal to 2.5:1.

4. A hydraulic torque converter as defined in claim 1, in which said reaction blades have an aspect ratio less than 0.8:1.

5. A hydraulic torque converter as defined in claim 1, in which said reaction blades have an aspect ratio substantially equal to 0.65:1.

6. A hydraulic torque converter as defined in claim 1, in which the trailing edges of said reaction blades are located at substantially the same distance from the axis of rotation as the leading edges of said impeller blades.

7. A hydraulic torque converter as defined in claim 1, in which said impeller blades have an aspect ratio of about 1.

References Cited in the file of this patent

UNITED STATES PATENTS

| | | |
|---|---|---|
| 2,135,282 | Fottinger | Nov. 1, 1938 |
| 2,147,528 | Fottinger | Feb. 14, 1939 |
| 2,255,430 | Lysholm et al. | Sept. 9, 1941 |
| 2,292,384 | Lysholm | Aug. 11, 1942 |
| 2,306,758 | Schneider et al. | Dec. 29, 1942 |

(Other references on following page)

UNITED STATES PATENTS

| | | |
|---|---|---|
| 2,327,214 | Pollard | Aug. 17, 1943 |
| 2,351,517 | Jandasek | June 13, 1944 |
| 2,365,879 | Jandasek | Dec. 26, 1944 |
| 2,381,187 | Swift | Aug. 7, 1945 |
| 2,410,185 | Schneider et al. | Oct. 29, 1946 |
| 2,418,362 | Miller | Apr. 1, 1947 |
| 2,471,179 | Wemp | May 24, 1949 |
| 2,558,976 | O'Leary | July 3, 1951 |
| 2,585,851 | Salerni | Feb. 12, 1952 |
| 2,607,456 | Jandasek | Aug. 19, 1952 |
| 2,663,148 | Jandasek | Dec. 22, 1953 |
| 2,663,149 | Zeidler et al. | Dec. 22, 1953 |

FOREIGN PATENTS

| | | |
|---|---|---|
| 749,133 | Great Britain | May 16, 1956 |